Patented Sept. 9, 1941

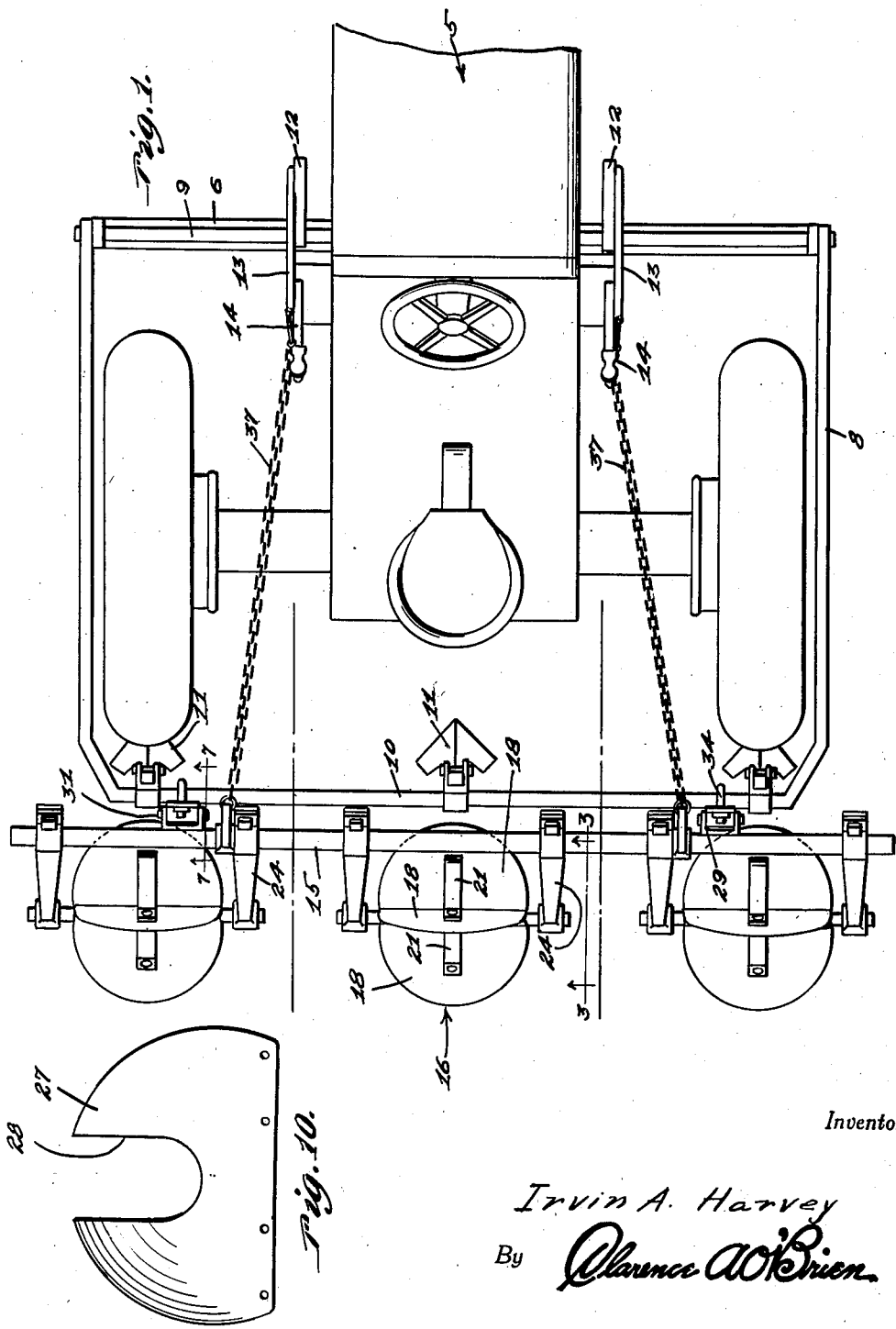

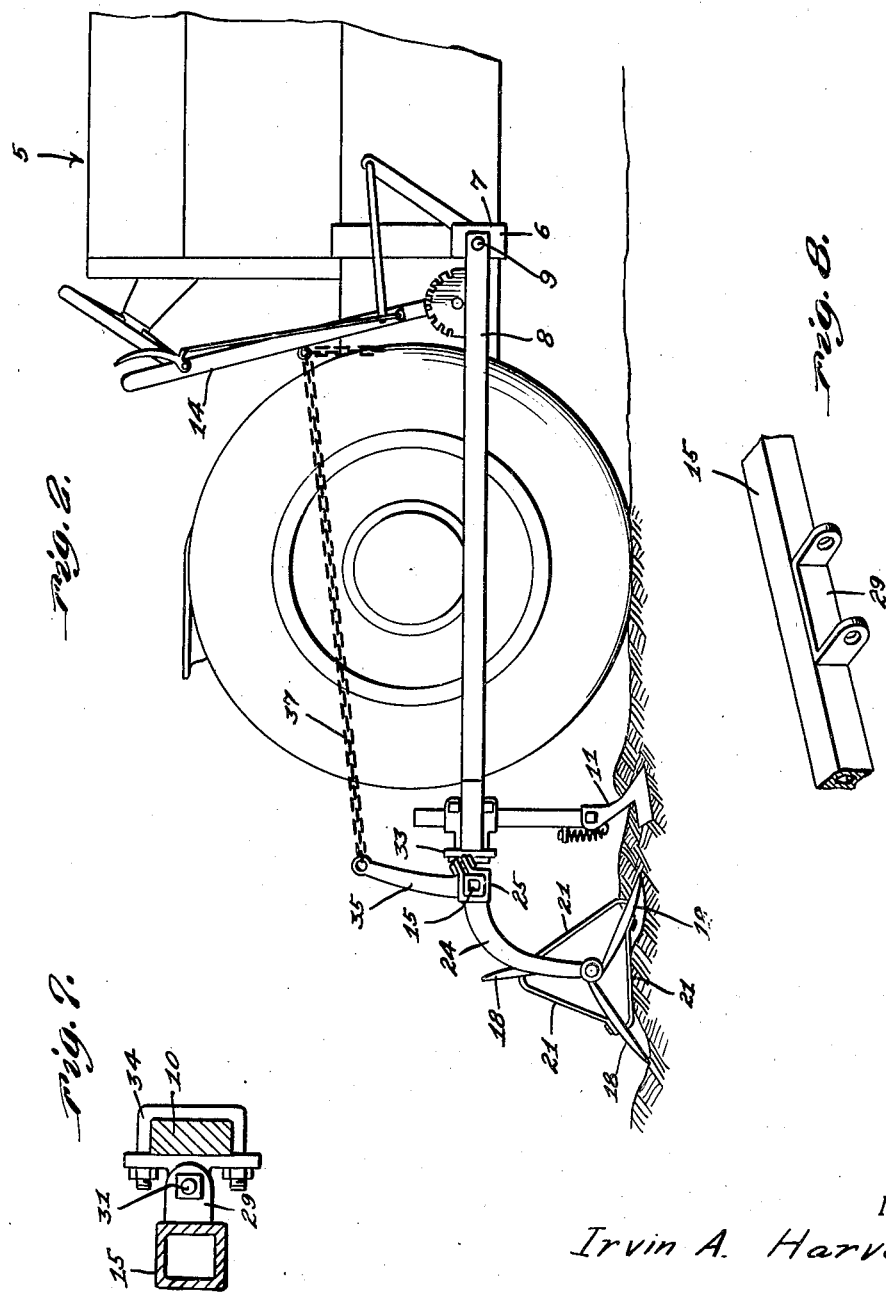

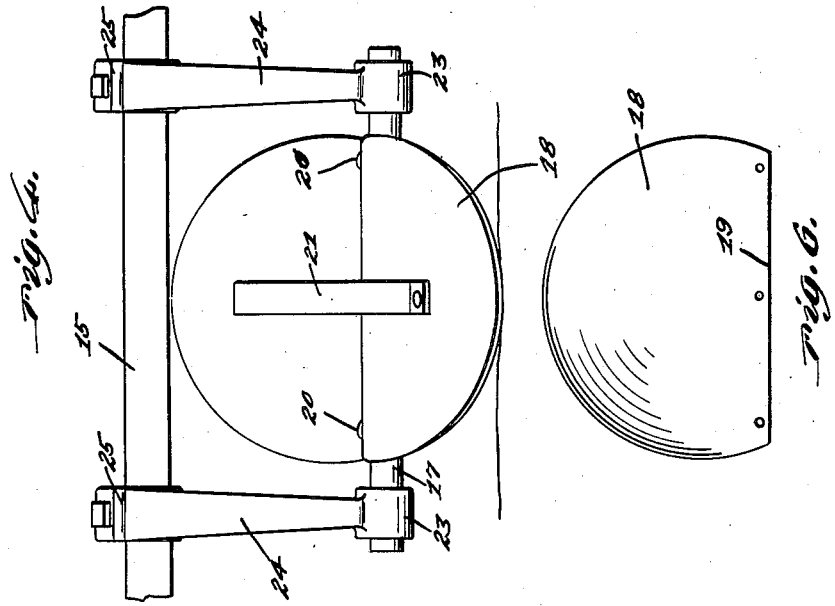
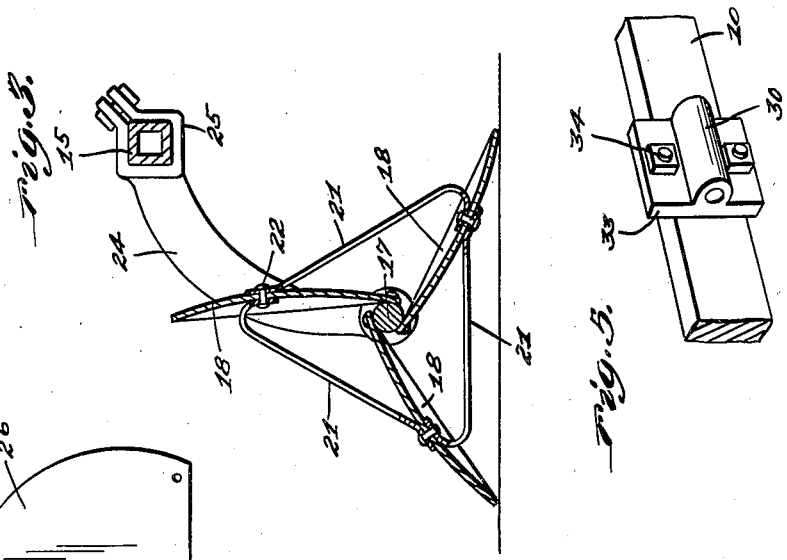
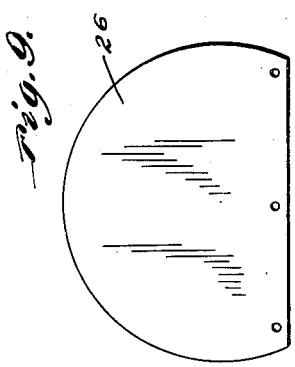

2,255,562

UNITED STATES PATENT OFFICE 2,255,562

AGRICULTURAL MACHINE

Irvin A. Harvey, Harvey, Iowa

Application September 17, 1940, Serial No. 357,170

4 Claims. (Cl. 97—52)

This invention appertains to new and useful improvements in farm machinery and more particularly to a damming appliance.

The principal object of the present invention is to provide an appliance for farm machinery operative to prevent soil erosion by building dams in furrows to the end that water from rain or artificial irrigation can be caught and held against draining to a low point on acreage.

Other objects and advantages of the invention will become apparent to the reader of the following specification.

In the drawings:

Figure 1 represents a fragmentary top plan view showing the appliance attached to a tractor.

Figure 2 represents a side elevational view of the structure shown in Figure 1.

Figure 3 is a sectional view taken substantially on a line 3—3 of Figure 1.

Figure 4 is a fragmentary rear elevational view of one of the damming units.

Figure 5 is a fragmentary perspective view of the plow bar.

Figure 6 is a plan view of one of the cupped blades.

Figure 7 is a section on the line 7—7 of Figure 1.

Figure 8 is a fragmentary perspective view of the carrier bar for the damming units.

Figure 9 is a plan view of a flat blade.

Figure 10 is a plan view of a bifurcated blade.

Referring to the drawings, wherein like numerals designate like parts, it can be seen that numeral 5 generally refers to a farm tractor which is provided at its intermediate portion with a bar 6 passing under the chassis and suitably secured thereto and having the upstanding end portion 7 to which the leg portions 8 of a U-shaped lift frame are pivotally secured as at 9. The rear portion of this frame includes a transverse bar on which the cultivator shovels 11 are mounted as is clearly shown in Figures 1 and 2. The shaft 9 which carries the U-shaped frame has upstanding arms 12 connected by rods 13 to hand levers 14 which are provided with suitable detent means whereby the same can be held in proper position maintaining the cultivator elements in the proper ground relation.

Numeral 15 denotes a bar which serves as a carrier bar for the damming units generally referred to by numeral 16. Each unit consists of a shaft 17 to which is secured a plurality of dished or cupped substantially round blades 18. These blades have straight edge portions 19 which are disposed tangentially against the shaft 17 and secured thereto by screws or the like 20. Brace members 21 are disposed between the blades 18, as suggested in Figure 4 and suitably riveted thereto as at 22.

The shaft 17 is freely rotatable in bearings 23 at the lower ends of arcuate shaped arms 24, the upper ends of which are provided with square clamps 25 for engaging the square bar 15. Of course, if desired, the blades 18 may be flat as suggested by the blades 26 in Figure 9, or the blades may be as suggested in Figure 10 and denoted by numeral 7 wherein the blade is bifurcated, the same having the cut-away portion 28 so as to leave a ridge for the front wheels of the tractor to ride when corn or other crops are being shucked.

On the damming unit carrying bar 15 are U-shaped brackets 29 in which the barrels 30 of the cultivator bar 10 are disposed and pins 31 are disposed through the ends of the brackets 29 and barrels 30 to hingedly connect the damming bar 15 to the cultivator bar 10.

The barrels 30 are located on plates 33 which are held against the cultivator bar 10 by U-clamps 34.

As can be seen clearly in Figure 2, upstanding arms 35 are provided on the damming bar 15 and between the upper ends of these arms 35 and the cultivating lifting levers 36 are chains 37. Obviously, when the levers 36 are moved forwardly to lift the cultivator, the damming units will also be elevated.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A damming attachment for cultivators comprising a carrier bar, a pair of arms depending from the bar, a shaft freely rotatable on the arms, laterally disposed blades, means for securing certain edge portions of the blades to the shaft and brace means between the blades.

2. A damming attachment for cultivators comprising a carrier bar, a pair of arms depending from the bar, a shaft freely rotatable on the arms, laterally disposed blades, means for securing certain edge portions of the blades to the shaft, said blades having their ground engaging lead edges bifurcated.

3. A damming attachment for cultivators comprising a carrier bar, a pair of arms depending from the bar, a shaft freely rotatable on the arms, laterally disposed blades, said blades being secured at certain of their edges directly to the shaft, the ground engaging edge portions of the blades being formed with ridge forming cut out portions.

4. A damming attachment for cultivators comprising a carrier bar, a pair of arms depending from the bar, a shaft freely rotatable on the arms, laterally disposed blades, said blades being secured at certain of their edges directly to the shaft, the ground engaging edge portions of the blades being formed with ridge forming cut out portions, said blades being substantially of semi-circular shape with the curved edge portions thereof forming the ground engaging edges of the blades.

IRVIN A. HARVEY.